Figure 1:
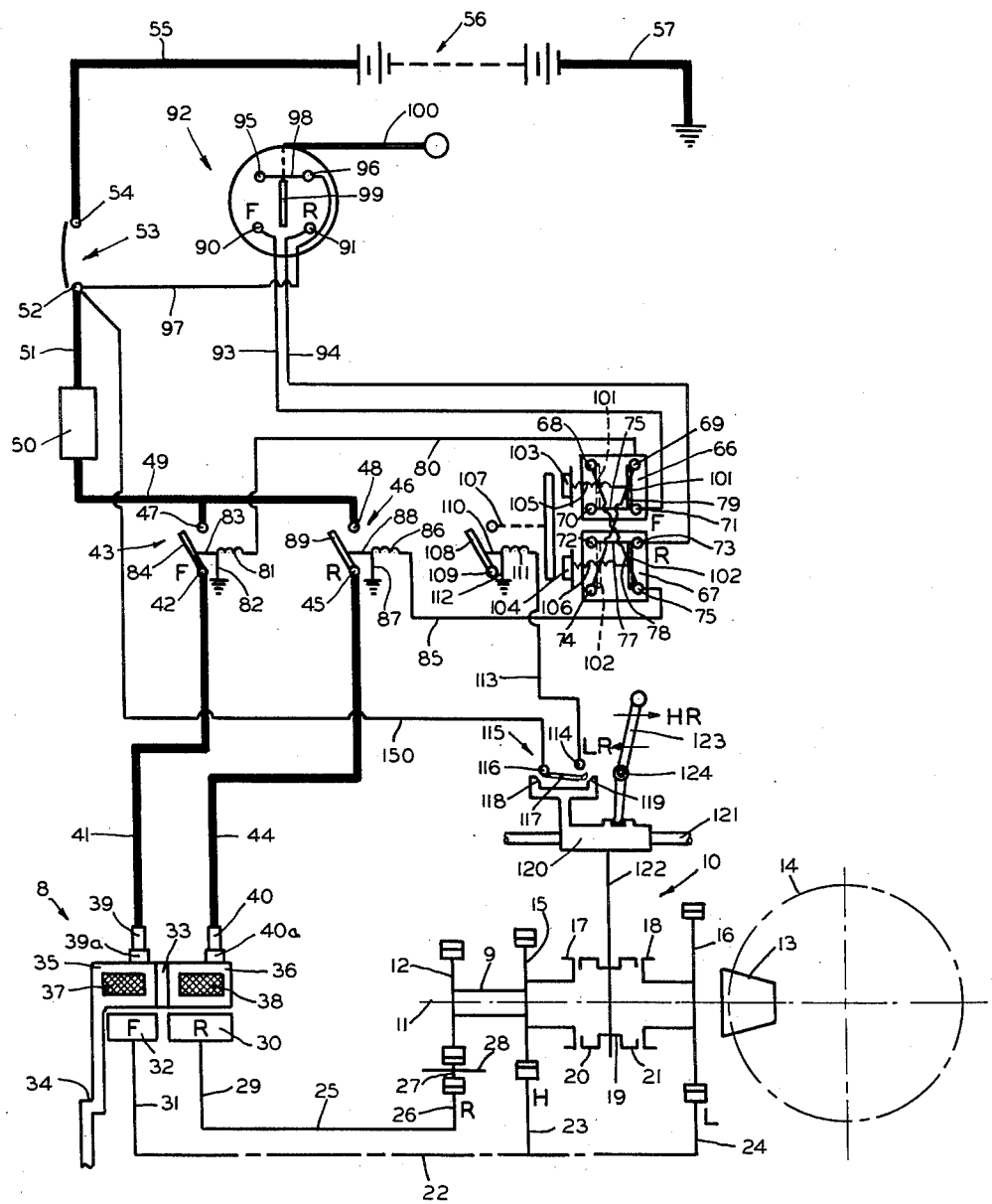

INVENTOR.
GEORGE P. MARCO
BY
ATTYS.

Patented Nov. 10, 1953

2,658,403

UNITED STATES PATENT OFFICE 2,658,403

CONTROL SYSTEM FOR TRANSMISSIONS

George P. Marco, Battle Creek, Mich., assignor to Clark Equipment Company, Buchanan, Mich., a corporation of Michigan Application November 13, 1950, Serial No. 195,184

6 Claims. (Cl. 74—330)

My invention relates generally to a control system for a transmission and, more specifically, is directed to a control system for effecting momentary braking of the gear means of a transmission when a shift from one ratio drive to another ratio drive is effected in either forward or reverse drive.

The control means of my present invention by way of example, is particularly adapted for use with a transmission mechanism of the character disclosed in the copending application of Elmer J. Dunham, Serial No. 762,439, filed July 21, 1947, now Patent No. 2,549,896 issued April 24, 1951. Such a transmission mechanism comprises an output shaft and forward and reverse drive eddy current clutches. High ratio drive and low ratio drive gear means are provided between the eddy current clutches and the output shaft. A clutch collar member is mounted on the output shaft and is adapted to selectively couple one of the gear means to the output shaft for effecting either high ratio drive or low ratio drive thereto in either forward or reverse drive. I have observed in this form of transmission mechanism that considerable gear clash takes place when the clutch collar member is shifted from one ratio drive to the other ratio drive. This obviously places a severe strain on the gear teeth.

It is an object of my present invention to provide control means for effecting momentary braking of the gear means of a transmission when a shift from one ratio drive to another ratio drive is effected in either forward or reverse drive.

I propose to provide control means for a transmission mechanism of the character noted above which will effect momentary deenergization of the driving clutch and simultaneous energization of the other clutch for imparting torque to the gear means in a direction to counteract the torque normally imparted to the gear means, when a shift from one ratio drive to the other ratio drive is effected. Momentary braking of the gear means is thus effected and the clutch collar member may be easily and quietly shifted from one ratio drive to the other ratio drive.

Now, in order to acquaint those skilled in the art with the manner of constructing and using the device of my present invention, I shall describe in connection with the accompanying drawing, a preferred embodiment of my present invention.

In the drawing:

Figure 1 is a schematic diagram of the control circuit of my present invention.

Referring now to the drawing, there is shown diagrammatically clutch means at 8 and a transmission at 10. The transmission 10 comprises an output or driven shaft 11 on which a compound gear 9 is rotatably journaled at one end thereof. The compound gear 9 is formed with axially spaced gear portions 12 and 15. Mounted on the other end of the shaft 11 is a pinion 13 which is adapted to have meshing engagement with a ring gear 14 operatively connected in a known manner to the drive axles (not shown) of a vehicle. Mounted for rotation on the shaft 11 intermediate of the compound gear 9 and pinion 13 is a gear 16. The gears 9 and 16 are provided respectively with jaw clutch teeth 17 and 18. A clutch collar jaw member 19 is slidably mounted on the shaft 11 but is held against rotation relative thereto. The clutch collar member 19 is provided at its opposite ends with jaw clutch teeth 20 and 21 which are adapted to be disposed respectively in engagement with jaw clutch teeth 17 and 18 of gears 9 and 16, for clutching the latter selectively to the output shaft 11.

The transmission 10 further comprises a main or drive shaft 22 which has secured thereon a pair of axially spaced gears 23 and 24 which have meshing engagement respectively with gears 15 and 16. Rotatably mounted on the shaft 22 is a quill or sleeve member 25 which at its one end has secured thereon a gear 26. The gear 26 has meshing engagement with an idler gear 27 mounted on a lay shaft 28 and the gear 27 in turn has meshing engagement with the gear 12 on shaft 11. The clutch means 8 is operatively connected to the ends of the shaft 22 and sleeve 25. Secured to the end of the sleeve member 25 is a radial flange member 29 which at its outer periphery carries an annular pole piece 30. Fixed to the drive shaft 22 is a radial flange member 31, which at its outer periphery carries an annular pole piece 32.

The clutch means 8 further comprises a rotatable housing 33 having a radial flange 34 which is adapted to be secured in a known manner, to the flywheel housing of a prime mover (not shown). The rotatable housing 33 comprises a pair of axially spaced annular flywheel casings 35 and 36, preferably joined together by welding or the like, which casings 35 and 36 carry annular magnetic cores or field windings 37 and 38 respectively. Electrical connection is selectively effected to one side of each of the magnetic cores 37 and 38 by means of conventional brushes 39 and 40 having frictional contact with collector rings 39a and 40a carried respectively by casings 35 and 36. The other sides of the magnetic cores 37 and 38 are grounded.

Upon energization of the magnetic core 38, an eddy current is set up within the casing 36 which tends to attract the pole piece 30 for conjoint rotation therewith. The amount of current introduced into the magnetic core 38 effects control of the magnetic field and determines the amount of slippage that will take place between the casing 36 and pole piece 30. On deenergization of the magnetic core 38 and upon energization of the magnetic core 37, an eddy current is set up within the casing 35 which tends to attract the pole piece 32 for conjoint rotation therewith.

The brush 39 is electrically connected through a line 41 to the terminal 42 of a solenoid operated magnetic contactor indicated generally by the reference numeral 43. The brush 40 has electrical connection through line 44 to the terminal 45 of a solenoid operated magnetic contactor indicated generally by the reference numeral 46. The contacts 47 and 48 respectively of the magnetic contactors 43 and 46, are both connected through a line 49 to the one side of a voltage regulator 50. The voltage regulator 50 at its other end is electrically connected through a line 51 to the terminal 52 of a circuit breaker indicated generally by the reference numeral 53. The terminal 54 of the circuit breaker 53 is electrically connected through a line 55 to the positive terminal of a battery indicated generally at 56. The negative terminal of the battery 56 is connected through a line 57 to ground.

A pair of double pole single throw solenoid operated magnetic contactors 66 and 67 are disposed closely adjacent each other. The contactor 66 is provided with a plurality of contacts 68, 69, 70 and 71 and the magnetic contactor 67 is provided with a plurality of contacts 72, 73, 74 and 75. The contacts 70 and 71 of the contactor 66 are interconnected by a line 76 and the contacts 72 and 73 of the contactor 67 are interconnected by a line 77. Contact 68 of contactor 66 is connected with contact 75 of contactor 67 by a line 78 and the contact 69 of contactor 66 is connected with contact 74 of contactor 67 by a line 79. The contactors 66 and 67 form a reverser mechanism.

Contact 69 of contactor 66 is also connected through a line 80 to one end of a solenoid or coil 81 associated with the aforedescribed magnetic contactor 43. The coil 81 at its other end is connected through a line 82 to ground.

Disposed in the coil 81 is a plunger 83 which is pivotally connected to a switch arm or blade 84 pivotally connected at its one end to the terminal 42. When the coil 81 is energized, the plunger 83 is retracted and the free end of the blade 84 is caused to engage contact 47 for closing the circuit between the latter and the terminal 42.

Contact 75 of contactor 67 is connected through a line 85 to the one end of a solenoid or coil 86 associated with the aforedescribed magnetic contactor 46. The coil 86 at its other end is connected to ground through a line 87. Disposed within the coil 86 is a plunger 88 which is pivotally connected at its outer end to a switch blade 89 pivotally connected at one end to the terminal 45. When the coil 86 is energized, the plunger 88 is retracted and the free end of the blade 89 is caused to engage contact 48 for closing the circuit between the latter and the terminal 45.

Contact 71 of contactor 66 and contact 73 of contactor 67 are respectively connected with contacts 90 and 91, of a manually operable switch indicated generally by the reference numeral 92, through suitable lines 93 and 94. The switch 92 is adapted to be mounted to the steering column of the vehicle. The contact 96 of the switch 92 is connected through a line 97 to the terminal 52 of the aforedescribed circuit breaker 53. Contacts 95 and 96 of switch 92 are interconnected by a line 98.

The switch 92 is provided with a blade 99 operatively connected to a manually operable forward-reverse selector lever 100 which in one position is adapted to dispose the blade 99 in the position shown in Figure 1. In another position, the lever 100 is adapted to dispose the blade 99 into engagement with the contacts 90 and 95 for closing the circuit between the latter, and the lever 100, in still another position, is adapted to dispose the blade 99 into engagement with the contacts 91 and 96 for closing the circuit between the latter.

The aforedescribed magnetic contactors 66 and 67 are provided respectively with blade members 101 and 102 which are adapted normally to interconnect respectively, contacts 69 and 71 of contactors 66, and contacts 73 and 75 of contactor 67, as shown in Figure 1. A plunger 103 is operatively connected to the blade member 101 and a plunger 104 is operatively connected to the blade member 102, which plungers 103 and 104, when moved to the right from the position shown in Figure 1, cause the blade members 101 and 102 to move to the left from the solid line to the dotted line positions shown in Figure 1, for interconnecting respectively contacts 68 and 70 of contactor 66, and contacts 72 and 74 of contactor 67. The plungers 103 and 104 are normally biased to the position shown in Figure 1 respectively by springs 105 and 106.

A mechanically operable plunger assembly 107 is disposed adjacent the outer ends of plungers 103 and 104. A switch arm 108 is pivotally mounted at 109 and the free end of switch arm 108 is adapted to engage the mechanical plunger assembly 107 for urging the latter to the right from the position shown in Figure 1, and thereby forcing the plungers 104 and 103 toward the right. A plunger 110 is pivotally mounted at its one end to the switch arm 108 and the plunger 110 is disposed within a solenoid or coil 111. The coil 111 at its one end, is connected through a line 112 to ground, and at its other end is connected through a line 113 to the contact 114 of a limit switch indicated generally at 115. The terminal 116 of the limit switch 115 is connected through a line 150 to the terminal 52 of the aforedescribed circuit breaker 53.

A blade member 117 is pivotally mounted at its one end to the terminal 116 of switch 115 and the blade member 117 at its other end is adapted to be disposed in engagement with the contact 114 for closing the circuit between the latter and the terminal 116. Vertical movement of the free end of the blade member 117 into engagement with contact 114 is adapted to be effected by a pair of axially spaced cam portions 118 and 119 of a cam assembly 120 slidably mounted on a shaft 121. The cam assembly 120 carries a shift fork 122 which is disposed about the aforedescribed clutch collar member 19 of the transmission 10. Axial movement of the cam member 120 is adapted to be effected by means of a lever 123, pivotally mounted intermediate its ends at 124.

When the limit switch 115 is open, the switch blades 101 and 102 of contactors 66 and 67 are disposed in the position shown in Figure 1. When the free end of the blade 117 of switch 115 is moved upwardly into engagement with contact 114 by means of the cam surfaces 118 or 119, the coil 111 is energized for effecting operation of contactors 66 and 67, and the blades 101 and 102 are disposed in the dotted line position.

The following is a description of the operation of the electrical circuit of my present invention. When the shift lever 123 is pivoted counterclockwise about its pivotal mounting 124, the cam assembly 120 is moved to the right, as shown in Figure 1, which moves the clutch collar member 19 to the right, and disposes the jaw clutch teeth 21 into engagement with the jaw clutch teeth 18 of gear 16 for clutching the latter to the driven shaft 11. The lever 100 is then moved to a forward drive position, disposing the blade member 99 across the contacts 95 and 96. Current from the battery 56 then flows through line 55, circuit breaker 53, line 97, line 98, blade 99, line 93, blade 101, line 80, and hence through coil 81 and line 82 to ground. The coil 81 is thus energized, retracting plunger 83, causing the free end of switch blade 84 to engage contact 47. Current then flows from the battery 56 through line 55, circuit breaker 53, line 51, voltage regulator 50, line 49, blade 84, line 41, brush 39, and collector ring 38a to the coil 37. Upon energization of the coil 37, the pole piece 32 is attracted thereto for conjoint rotation. If the housing member 33 is caused to rotate, the pole piece 32, flange 31, and shaft 22 rotate therewith. High ratio drive is then transmitted to the pinion 13, through gear 24, gear 16, clutch collar member 19, and shaft 11.

When it is desired to shift from high to low ratio drive, the shift lever 123 is pivoted clockwise about its pivotal connection 124, thereby shifting the cam assembly 120 to the left, as viewed in Figure 1. Initial movement of the cam assembly 120 to the left effects disengagement of the jaw clutch teeth 18 and 21 and causes cam surface 119 to engage the free end of switch arm 117, thereby urging the latter into engagement with contact 114, closing the limit switch 115. With the limit switch 115 closed, current flows from the battery 56 through line 55, circuit breaker 53, line 150, blade 117, line 113, coil 111, and line 112 to ground. The coil 111 is thus energized and the plunger 110 is retracted, causing clockwise pivotal movement of the switch arm 108. Clockwise rotation of the switch arm 108 causes the plunger assembly 107 to move to the right thereby depressing plungers 103 and 104, which causes the blade members 101 and 102 to move from the solid line to the dotted line positions, shown in Figure 1.

When the blade members 101 and 102 are disposed in the dotted line positions, the contactor 43 is opened and current flow to the forward drive coil is interrupted. Simultaneously, the contactor 46 is closed and the reverse drive coil 38 is energized. Current then flows from battery 56 through line 57, circuit breaker 53, line 97, line 98, blade 99, line 93, line 76, blade 101, line 78, line 85, coil 86 and line 87 to ground. Thus, the coil 86 is energized causing the plunger 88 to be retracted, which, in turn, effects clockwise pivotal movement of the switch arm 89 and thereby disposing the latter into engagement with contact 48. Current then flows from battery 56 through line 55, circuit breaker 53, line 51, voltage regulator 50, line 49, switch blade 89, line 44, brush 40 and collector ring 40a to the coil 38, energizing the latter. Energization of the coil 38 attracts the pole piece 30 which is caused to rotate conjointly therewith. Drive is then effected from the housing 33, through the pole piece 30, flange 29, sleeve or quill member 25, gear 26, reverse idler 27, to gear portion 12 of compound gear 9, in a reverse direction. This momentary reverse drive to the compound gear 9 counteracts the forward drive previously imparted to the latter.

The jaw clutch teeth 20 of the clutch collar member 19 may be easily engaged with the jaw clutch teeth 17 of gear 15 upon further axial movement of the cam assembly 120 to the left, as viewed in Figure 1. Also, upon further movement of the cam assembly 120 to the left, the switch arm 117 is permitted to drop away from engagement with contact 114 which opens up the circuit and deenergizes the coil 111, permitting the springs 105 and 106 to urge plungers 103 and 104, together with the plunger assembly 107, to the left, as viewed in Figure 1. The switch blades 101 and 102 are then returned to their normal position, as viewed in Figure 1. The contactor 46 is opened interrupting current flow to the reverse drive coil 38 and the contactor 43 is closed permitting current to flow to the forward drive coil 37.

Forward low ratio drive is thus effected from the housing 33 through the pole piece 32, flange 31, main shaft 22, gear 23, gear 15, clutch collar member 19, and driven shaft 11 to the pinion 13.

When it is desired to return the transmission to high ratio drive, the shift lever 123 is rocked counterclockwise about its pivotal connection 124, thereby shifting the cam assembly 120 to the right. Initial movement of the cam assembly 120 to the right effects disengagement of jaw clutch teeth 17 and 20 and causes cam surface 118 to engage the free end of switch arm 117, thereby urging the latter into engagement with contact 114, closing the limit switch 115. With the limit switch 115 closed, current flows from the battery through line 55, circuit breaker 53, line 150, blade 117, line 113, coil 111, and line 112 to ground. The coil 111 is thus energized and the plunger 110 is retracted, causing clockwise pivotal movement of the switch arm 108. Clockwise rotation of the switch arm 108 causes the plunger assembly 107 to move to the right thereby depressing plungers 103 and 104, which causes the blade members 101 and 102 to move from the solid line to the dotted line positions.

When the blade members 101 and 102 are disposed in the dotted line positions, the contactor 43 is opened and current flow to the forward drive coil 37 is interrupted. Simultaneously, the contactor 46 is closed and the reverse drive coil 38 is energized. Current then flows from battery 56 through line 57, circuit breaker 53, line 97, line 98, blade 99, line 93, line 76, blade 101, line 78, line 85, coil 86, and line 87 to ground. Thus, the coil 86 is energized causing the plunger 88 to be retracted, which, in turn effects clockwise pivotal movement of the switch arm 89 and thereby disposing the latter into engagement with contact 48. Current then flows from battery 56 through line 55, circuit breaker 53, line 51, voltage regulator 50, line 49, switch blade 89, line 44, brush 40, and collector ring 40a to the coil 38, energizing the latter. Energization of the coil 38 attracts the pole piece 30 which is caused to rotate conjointly therewith. Drive is then effected from the housing 33, through the pole piece 30, flange 29, sleeve member 25, gear 26, reverse idler 27, compound gear 9, gear 23, shaft 22, gear 24 to gear 16 in a reverse direction. This momentary reverse drive to the gear 16 counteracts the forward drive previously imparted to the latter.

The jaw clutch teeth 21 of the clutch collar member 19 may be easily engaged with the jaw clutch teeth 18 of gear 16 upon further axial movement of the cam assembly 120 to the right. Also, upon further movement of the cam assembly 120 to the right, the switch arm 117 is permitted to drop away from engagement with contact 114 which opens up the circuit and deenergizes the coil 111, permitting the springs 105 and 106 to urge plungers 103 and 104, together with the plunger assembly 107, to the left. The switch blades 101 and 102 are then returned to their normal solid line position. The contactor 46 is opened interrupting current flow to the reverse drive coil 38 and the contactor 37 is closed permitting current to flow to the forward drive coil 37.

Rotation of the housing 33 is then again transmitted to the pinion 13, in high ratio drive through pole piece 32, flange 31, shaft 22, gear 24, gear 16, clutch collar member 19, and shaft 11.

If it should be desired to drive in high ratio reverse, the shift lever 123 is pivoted counterclockwise about its pivotal connection 124 thereby moving the cam assembly 120 to the right, as viewed in Figure 1, which, in turn, causes the jaw clutch teeth 21 of clutch collar member 19 to be disposed in engagement with the jaw clutch teeth 18 of gear 16 for effecting a high ratio drive to the shaft 11. The lever 100 is then moved to a reverse drive position, causing the blade member 99 to be disposed in engagement with contacts 96 and 91.

Current then flows from the battery 56 through line 55, circuit breaker 53, line 97, blade 99, line 94, blade 102, line 85, coil 86 and line 87 to ground. Upon energization of the coil 86, the plunger 88 is retracted causing clockwise rotation of the switch arm 89, thereby disposing the free end of the latter into engagement with the contact 48. Current then flows from the battery 56 through line 55, circuit breaker 53, line 51, voltage regulator 50, line 49, blade 89, line 44, brush 40 and collector ring 40a to the coil 38. Upon energization of the coil 38, the pole piece 30 is caused to rotate conjointly with the casing 36. High ratio reverse drive is then effected from the housing 33 through the pole piece 30, flange 29, sleeve member 25, gear 26, reverse idler 27, compound gear 9, gear 23, shaft 22, gear 24, gear 16, clutch collar member 19, and shaft 11 to the pinion 13.

When it is desired to drive in low ratio reverse, the shift lever 123 is pivoted clockwise about its pivotal connection 124, thereby causing the cam assembly 120 to be shifted to the left, as viewed in Figure 1. Initial movement of the cam assembly 120 to the left effects disengagement of jaw clutch teeth 18 and 21 and causes the cam portion 119 to engage the free end of switch arm 117, thereby disposing the latter into engagement with contact 114, closing the limit switch 115. With the limit switch 115 closed, current flows from the battery 56 through line 55, circuit breaker 53, line 150, blade 117, line 113, coil 111, and line 112 to ground. The coil 111 is thus energized and the plunger 110 is retracted, causing clockwise pivotal movement of the switch arm 108. Clockwise rotation of the switch arm 108 causes the plunger assembly 107 to move to the right thereby depressing plungers 103 and 104, which causes the blade members 101 and 102 to move from the solid line to the dotted line positions.

When the blade members 101 and 102 are disposed in the dotted line positions, the contactor 46 is opened and current flow to the reverse drive coil 38 is interrupted. Simultaneously, the contactor 43 is closed and the forward drive coil 37 is energized.

Current then flows from battery 56 through line 55, circuit breaker 53, line 97, switch blade 99, line 94, line 77, blade 102, line 79, line 80, coil 81, and line 82 to ground. Upon energization of the coil 81, the plunger 83 is retracted thereby causing clockwise rotation of the switch arm 84 disposing the free end thereof into engagement with the contact 47. Current then flows from the battery through line 55, circuit breaker 53, line 51, voltage regulator 50, line 49, blade 84, line 41, brush 39 and collector ring 39a to the coil 37, thereby energizing the latter. Forward drive is thus momentarily effected to the compound gear 9 counteracting the reverse torque previously imparted thereto.

The jaw clutch teeth 20 of the clutch collar member 19 may be easily engaged with the jaw clutch teeth 17 of gear 15 upon further axial movement of the cam assembly 120 to the left. Also, upon further movement of the cam assembly 120 to the left, the switch arm 117 drops away from engagement with contact 114 opening limit switch 115. The coil 111 is deenergized and the springs 105 and 106 return plungers 103 and 104, together with plunger assembly 107 to the position shown in Figure 1. Simultaneously, the switch blades 101 and 102 are returned to their solid line position. The contactor 43 is opened interrupting current flow to the forward drive coil 37 and the contactor 46 is closed permitting current to flow to the reverse drive coil 38.

Reverse low ratio drive is thus effected from the housing 33 through the pole piece 30, flange 29, sleeve member 25, gear 26, reverse idler 27, compound gear 9, clutch collar member 19, and shaft 11, to the pinion 13.

When it is desired to return to high ratio reverse drive the shift lever 123 is rocked counterclockwise about its pivotal connection 124 thereby moving the cam assembly 120 to the right. Initial movement of the cam assembly 120 to the right effects disengagement of jaw clutch teeth 17 and 20 and causes the cam portion 118 to engage the free end of switch arm 117, thereby disposing the latter into engagement with contact 114 closing the limit switch 115. With the limit switch 115 closed, current flows from the battery 56 through line 55, circuit breaker 53, line 150, blade 117, line 113, coil 111, and line 112 to ground. The coil 111 is thus energized and the plunger 110 is retracted, causing clockwise pivotal movement of the switch arm 108. Clockwise rotation of the switch arm 108 causes the plunger assembly 107 to move to the right thereby depressing plungers 103 and 104 which causes the blade members 101 and 102 to move from the solid line to the dotted line position.

When the blade members 101 and 102 are disposed in the dotted line positions, the contactor 46 is opened and current flow to the reverse drive coil 38 is interrupted. Simultaneously, the contactor 43 is closed and the forward drive coil 37 is energized.

Current then flows from the battery 56 through line 55, circuit breaker 53, line 97, switch blade 99, line 94, line 77, blade 102, line 79, line 80, coil 81, and line 82 to ground. Upon energization of the coil 81, the plunger 83 is retracted thereby causing clockwise rotation of the switch arm 84 disposing the free end thereof into engagement with the contact 47. Current then flows from the battery 56 through line 55, circuit breaker 53, line 51, voltage regulator 50, line 49, blade 84, line 41, brush 39, and collector ring 39a to the coil 37, thereby energizing the latter. Forward drive is thus momentarily effected to the gear 16 through the pole piece 32, flange 31, shaft 22 and gear 24, counteracting the reverse torque previously imparted to gear 16.

The jaw clutch teeth 21 of the clutch collar member 19 may be easily engaged with the jaw clutch teeth 18 of gear 16 upon further axial movement of the cam assembly 120 to the right. Also, upon further movement of the cam assembly 120 to the right, the switch arm 117 is permitted to drop away from engagement with contact 114 opening the limit switch 115. The coil 111 is deenergized and the springs 105 and 106 return plungers 103 and 104, together with plunger assembly 107 to the position shown in Figure 1. Simultaneously, the switch blades 101 and 102 are returned to their solid line position. The contactor 43 is opened interrupting current flow to the forward drive coil 37 and the contactor 46 is closed permitting current to flow to the reverse drive coil 38.

Reverse high ratio drive is thus again effected from the housing 33 to the pinion 13, through the pole piece 30, flange 29, sleeve member 25, gear 26, reverse idler 27, compound gear 9, gear 23, shaft 22, gear 24, gear 16, clutch collar member 19, and shaft 11.

From the foregoing description, it will be seen that I have provided an electrical circuit for effecting momentary braking of the gears of a transmission when a shift, either from low to high ratio drive or from high to low ratio drive, is effected either in forward or reverse drive.

While I have shown and described what I believe to be a preferred embodiment of my present invention, it will be understood that various rearrangements and modifications may be made therein without departing from the spirit and scope of my present invention.

I claim:

1. For use in a transmission having a main shaft and a driven shaft, axially spaced gears fixed on said main shaft, axially spaced gears rotatably mounted on said driven shaft and driven from said gears on said main shaft, means for selectively coupling said rotatable gears to said driven shaft whereby said driven shaft may be driven in either one of two drive ratios, a quill rotatably mounted on said main shaft, reverse drive gear means between said quill and one of said rotatable gears, a forward drive eddy current clutch associated with said main shaft, and a reverse drive eddy current clutch associated with said quill, control means comprising, means for selectively energizing one of the eddy current clutches, and means for effecting momentary deenergization of the one clutch and simultaneous energization of the other clutch for braking the gears when a shift from one ratio drive to the other ratio drive is effected.

2. For use in a transmission having a main shaft and a driven shaft, axially spaced gears fixed on said main shaft, axially spaced gears rotatably mounted on said driven shaft and driven from said gears on said main shaft, means for selectively coupling said rotatable gears to said driven shaft whereby said driven shaft may be driven in either one of two drive ratios, a quill rotatably mounted on said main shaft, reverse drive gear means between said quill and one of said rotatable gears, a forward drive eddy current clutch associated with said main shaft, and a reverse drive eddy current clutch associated with said quill, control means comprising means for selectively energizing one of the eddy current clutches, and means for effecting momentary deenergization of the one clutch and simultaneous energization of the other clutch for braking the gears when a shift from one ratio drive to the other ratio drive is effected in either forward or reverse drive.

3. For use in a transmission having a main shaft and a driven shaft, axially spaced gears fixed on said main shaft, axially spaced gears rotatably mounted on said driven shaft and driven from said gears on said main shaft, means for selectively coupling said rotatable gears to said driven shaft whereby said driven shaft may be driven in either one of two drive ratios, a quill rotatably mounted on said main shaft, reverse drive gear means between said quill and one of said rotatable gears, a forward drive eddy current clutch associated with said main shaft, and a reverse drive eddy current clutch associated with said quill, control means comprising, a source of electrical energy, a first line between said source of electrical energy and the forward drive eddy current clutch, a first switch interposed in said first line, a second line between said source of electrical energy and the reverse drive eddy current clutch, a second switch interposed in said second line, means for selectively closing one of said switches, and means for effecting momentary opening of said one switch and simultaneous momentary closing of said other switch when a shift from one ratio drive to the other ratio drive is effected in either forward or reverse drive.

4. For use in a transmission having a main shaft and a driven shaft, axially spaced gears fixed on said main shaft, axially spaced gears rotatably mounted on said driven shaft and driven from said gears on said main shaft, means for selectively coupling said rotatable gears to said driven shaft whereby said driven shaft may be driven in either one of two drive ratios, a quill rotatably mounted on said main shaft, reverse drive gear means between said quill and one of said rotatable gears, a forward drive eddy current clutch associated with said main shaft, and a reverse drive eddy current clutch associated with said quill, control means comprising, a source of electrical energy, a first line between said source of electrical energy and the forward drive eddy current clutch, a first solenoid operated switch interposed in said first line, a second line between said source of electrical energy and the reverse drive eddy current clutch, a second solenoid operated switch interposed in said second line, means for selectively energizing one of said switches for closing the latter, and means for effecting momentary deenergization of said one switch for opening the latter and simultaneous momentary energization of said other switch for closing the latter when a shift from one ratio drive to the other ratio drive is effected in either forward or reverse drive.

5. For use in a transmission having a main shaft and a driven shaft, axially spaced gears fixed on said main shaft, axially spaced gears rotatably mounted on said driven shaft and driven from said gears on said main shaft, means for selectively coupling said rotatable gears to said driven shaft whereby said driven shaft may be driven in either one of two drive ratios, a quill rotatably mounted on said main shaft, reverse drive gear means between said quill and one of said rotatable gears, a forward drive eddy current clutch associated with said main shaft, and a reverse drive eddy current clutch associated with said quill, control means comprising, a source of electrical energy, a first line between said source of electrical energy and the forward drive eddy current clutch, a first solenoid operated switch interposed in said first line, a second line between said source of electrical energy and the reverse drive eddy current clutch, a second solenoid operated switch interposed in said second line, a manually operable switch having electrical connection with said source of electrical energy and with said solenoid operated switches, said manually operable switch being adapted to selectively connect one of said solenoid operated switches with said source of electrical energy for energizing said one solenoid operated switch to thereby close the latter, a reverser interposed between said manually operable switch and said solenoid operated switches, and means for operating said reverser for effecting momentary deenergization of said one solenoid operated switch for opening the latter and simultaneous momentary energization of said other solenoid operated switch for closing the latter when a shift from one ratio drive to the other ratio drive is effected in either forward or reverse drive.

6. For use in a transmission having a main shaft and a driven shaft, axially spaced gears fixed on said main shaft, axially spaced gears rotatably mounted on said driven shaft and driven from said gears on said main shaft, clutch means for selectively coupling said rotatable gears to said driven shaft whereby said driven shaft may be driven in either one of two drive ratios, a quill rotatably mounted on said main shaft, reverse drive gear means between said quill and one of said rotatable gears, a forward drive eddy current clutch associated with said main shaft, and a reverse drive eddy current clutch associated with said quill, control means comprising, a source of electrical energy, a first line between said source of electrical energy and the forward drive eddy current clutch, a first solenoid operated switch interposed in said first line, a second line between said source of electrical energy and the reverse drive eddy current clutch, a second solenoid operated switch interposed in said second line, a manually operable switch having electrical connection with said source of electrical energy and with said solenoid operated switches, said manually operable switch being adapted to selectively connect one of said solenoid operated switches with said source of electrical energy for energizing said one solenoid operated switch to thereby close the latter, a solenoid operated reverser interposed between said manually operable switch and said solenoid operated switches, a third line between said solenoid operated reverser and said source of electrical energy, a limit switch interposed in said third line, said solenoid operated reverser being energized when said limit switch is closed thereby effecting deenergization of said one solenoid operated switch for opening the latter and simultaneous energization of said other solenoid operated switch for closing the latter, and cam means operatively connected to the clutch means for effecting momentary closing of said limit switch when a shift from one ratio drive to the other ratio drive is effected in either forward or reverse drive.

GEORGE P. MARCO.

References Cited in the file of this patent
UNITED STATES PATENTS

| Number | Name | Date |
|---|---|---|
| 934,104 | Steckel | Sept. 14, 1909 |
| 1,268,777 | Willis | June 4, 1918 |
| 2,386,402 | Lilja | Oct. 9, 1945 |